US012730772B2

(12) United States Patent
Karl

(10) Patent No.: US 12,730,772 B2
(45) Date of Patent: Sep. 8, 2026

(54) TRANSMISSION OF USB DATA IN A DATA STREAM

(71) Applicant: Siemens Healthineers AG, Forchheim (DE)

(72) Inventor: Harald Karl, Fuerth (DE)

(73) Assignee: Siemens Healthineers AG, Forchheim (DE)

( * ) Notice: Subject to any disclaimer, the term of this patent is extended or adjusted under 35 U.S.C. 154(b) by 0 days.

(21) Appl. No.: 17/954,775

(22) Filed: Sep. 28, 2022

(65) Prior Publication Data

US 2023/0104594 A1 Apr. 6, 2023

(30) Foreign Application Priority Data

Oct. 1, 2021 (EP) .................................... 21200430

(51) Int. Cl.
*G06F 13/42* (2006.01)
*G06F 13/14* (2006.01)

(52) U.S. Cl.
CPC .......... *G06F 13/4282* (2013.01); *G06F 13/14* (2013.01); *G06F 2213/0042* (2013.01)

(58) Field of Classification Search
None
See application file for complete search history.

(56) References Cited

U.S. PATENT DOCUMENTS 8,713,239 B2 * 4/2014 Chang .................. G06F 13/385 710/33
8,825,925 B1 * 9/2014 Singh ..................... G06F 13/12 710/36
9,575,917 B1 2/2017 Zhu et al.
9,652,388 B2 * 5/2017 Shanbhogue ........ G11C 7/1072
9,736,071 B2 * 8/2017 Ajanovic ............ G06F 13/4252
10,042,784 B2 * 8/2018 Simmons .............. G06F 13/385
10,111,269 B2 * 10/2018 Babbage, II ............ H04L 25/00
10,609,741 B2 * 3/2020 Babbage, II .......... H04W 76/12
11,321,107 B1 * 5/2022 Eyberg ................ G06F 9/45545
11,755,526 B2 * 9/2023 Hulbert ............... H04W 12/068 710/72
2005/0119036 A1 * 6/2005 Albanna ................ A63F 13/42 463/7
2005/0264472 A1 * 12/2005 Rast ........................ G09G 3/14 345/30
2005/0273312 A1 12/2005 Sandulescu et al.
(Continued)

FOREIGN PATENT DOCUMENTS

EP 2075982 A2 7/2009
WO WO 2015148724 A1 10/2015

*Primary Examiner* — Henry Tsai
*Assistant Examiner* — Christopher A Bartels
(74) *Attorney, Agent, or Firm* — Harness, Dickey & Pierce, P.L.C.

(57) ABSTRACT

In a method for transfer of USB data in a data stream, which includes streaming data, the streaming data and the USB data, which includes a number of USB packets with a first number of bits, is received. The USB data is divided to create a number of transfer packets with a second number of bits of USB data. A transfer packet is inserted into the data stream, and the assembled data stream is transferred. An interruption pattern is added to at least an initial transfer packet to signal that USB data is present in the data stream.

28 Claims, 6 Drawing Sheets

(56) References Cited

U.S. PATENT DOCUMENTS

2008/0092043 A1* 4/2008 Trethewey ............ G06F 1/1686 715/705
2009/0161678 A1 6/2009 Huang et al.
2011/0010470 A1* 1/2011 Hulbert ............... G06F 13/4282 710/63
2011/0096930 A1* 4/2011 Walmsley ............. H04L 9/3247 380/278
2011/0110416 A1* 5/2011 Lawrence ............... G07F 17/32 375/E7.076
2012/0093214 A1* 4/2012 Urbach ................. G06F 40/143 375/E7.026
2013/0010617 A1* 1/2013 Chen ....................... G01S 1/725 370/252
2013/0282807 A1* 10/2013 Rudy .................... G06F 13/385 709/204
2013/0336334 A1 12/2013 Gilbert et al.
2015/0178241 A1* 6/2015 Ajanovic .............. G06F 13/124 710/29
2016/0240205 A1* 8/2016 Owen .................. H04N 19/147
2016/0278142 A1* 9/2016 Babbage, II .......... H04W 76/12
2016/0364246 A1* 12/2016 Lee .................... H04N 21/8173
2016/0370278 A1* 12/2016 Muir ...................... G01N 33/48
2017/0155910 A1* 6/2017 Owen ................ H04N 21/2343
2019/0004590 A1* 1/2019 Srivastava .......... G06F 13/4022
2019/0123998 A1* 4/2019 Baumgartl ......... G01R 33/3692
2019/0286817 A1* 9/2019 Butler ..................... G06F 21/57
2020/0117905 A1* 4/2020 Yakupov ................ G06V 20/46
2020/0356665 A1* 11/2020 Denney .................... G06N 7/01
2020/0406468 A1* 12/2020 Stoianovici .......... B25J 11/0005
2021/0019278 A1* 1/2021 Hulbert .............. G06Q 20/4012
2021/0201526 A1* 7/2021 Moloney ................ G06N 3/084
2021/0327018 A1* 10/2021 Carranza ................. H04L 67/10
2021/0385463 A1* 12/2021 Guruva reddiar ... H04N 19/179
2022/0060753 A1* 2/2022 Szegedi ............. H04N 21/4331
2022/0141709 A1* 5/2022 Simileysky ......... H04W 56/002 370/329
2022/0201320 A1* 6/2022 Karunaratne .......... G06V 20/41
2022/0327088 A1* 10/2022 Nahvi ..................... G06F 13/28
2023/0206755 A1* 6/2023 Jha ......................... G08G 1/005 340/425.5
2023/0244996 A1* 8/2023 Kumar ................... G06N 20/00 706/12
2023/0377460 A1* 11/2023 Sivanesan .............. G08G 1/143
2024/0028543 A1* 1/2024 Chen ......................... G06F 3/14
2024/0045827 A1* 2/2024 Li ........................... H04L 12/66
2024/0303210 A1* 9/2024 Natarajan ........... G06F 13/4295
2025/0103539 A1* 3/2025 Rajaraman .......... G06F 13/4282
2025/0291604 A1* 9/2025 Jehu .................... G06F 13/4081

* cited by examiner

100
TxData, RxData
23
21
22
24
25
32
33
StrData
31
40
Ser-Des-Data
30
40
StrData
33
20
RxData, TxData FIG 2
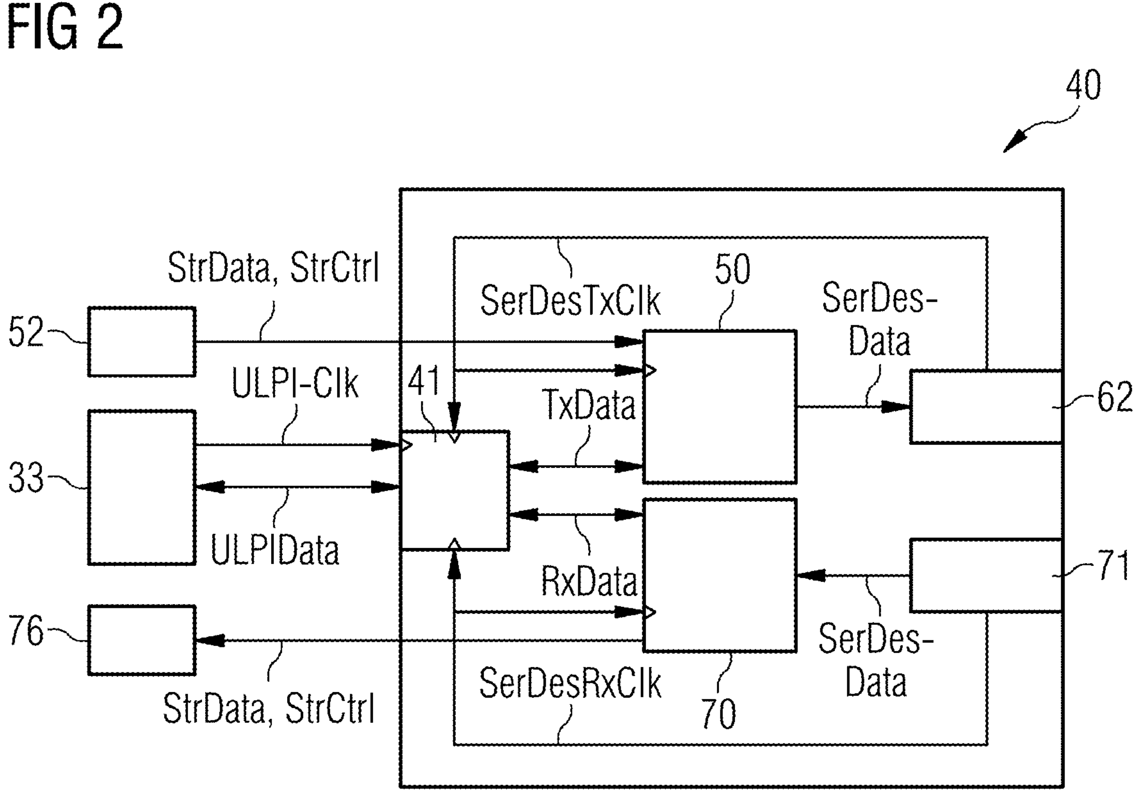
FIG 3
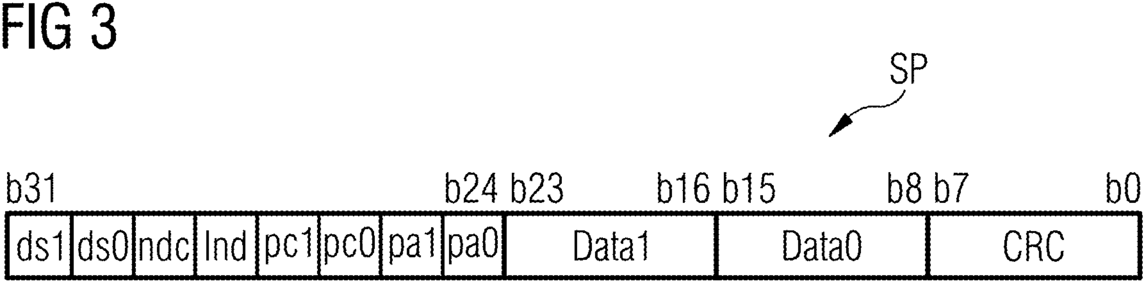
FIG 4
| Data1 | Data0 |
|---|---|
b7 — b0
| ct3 | ct2 | ct1 | ct0 | res | rsi | mt1 | mt0 |
|---|---|---|---|---|---|---|---|

TRANSMISSION OF USB DATA IN A DATA STREAM

CROSS-REFERENCE TO RELATED APPLICATION(S)

The present application claims priority under 35 U.S.C. § 119 to European Patent Application No. 21200430.3, filed Oct. 1, 2021, the entire contents of which are incorporated herein by reference.

FIELD

One or more example embodiments of the present invention relate to a method for sending USB data in a data stream, to a method for receiving such data and also to a send unit, a receive unit and/or a transmission system.

BACKGROUND

USB networks have the property that only limited distances (5 m) between the PC or host and the terminal can be covered. The main reason for this limitation is the maximum permitted round-trip delay or response time of 1.5 μs. When there is no response to USB host commands from the USB device within the permitted time, the host regards the command as lost. In order to fulfill the USB specification, the cable length should not be longer than 5 or 3 meters. The use of USB hubs connected between them in each case allows up to six of these cables to be daisy-chained. Thus overall a transmission path that is around 30 meters at most can be achieved.

A typical application case is to be found in medical technology: Frequently located in the examination room are the monitor and also the mouse and the keyboard, which must be connected via USB to the PC. The PC however is located between 10-30 m way in another room, e.g. in an operations room or a central computer or server room. This means that there is frequently a cabled video connection present between the PC and the display device and in addition a USB connection is needed, so that usually two cables are laid.

In practice optical extenders are known for covering greater distances than those that are provided for by the standard. These convert the electrical USB signal of a terminal directly into a light signal, transmit it and convert it back again at the receiver. In such cases a separate optical fiber cable is needed for each USB interface.

Moreover what are referred to as KVM extenders are known in practice. These do not transmit the USB signals transparently however, but usually require knowledge about the connected terminal.

SUMMARY

An object of one or more example embodiments of the present invention is to transmit both any given USB data and also any given further streaming data via one cable.

At least this object is achieved by a method for sending, a method for receiving, a send unit, a receive unit, and/or by a transmission system, according to one or more example embodiments of the present invention.

The method stated at the outset is used for sending of USB data in a data stream. The data stream in this case comprises any given streaming data. The method has the following steps. In one step the streaming data and at least a part of the USB data is received. The USB data comprises a number of USB packets with a first number of bits. In a further step the USB data is divided up in order to create a number of transfer packets with a second number of bits of USB data. Such a transfer packet is inserted in a following step into the data stream. The data stream put together is transferred in a further step. In this case at least one initial transfer packet has an interruption pattern added to it, in order for example to signal to a receiver that USB data is present in the data stream, especially in the following data stream.

The term data stream relates in general to a continuous flow of data records, of which the end is mostly not able to be foreseen in advance. The data stream is in particular transferred and/or received serially, i.e. the data records are processed continuously. The streaming data can be received as continuous or serial data basically in any given format or protocol (e.g. HSSL). The streaming data in this case comprises content such as e.g. audio data, video data, measurement data or also Ethernet data or the like, but not USB data. In this case it has a high data rate or bandwidth of several GB/s such as with 4K video data for example.

The USB data to be received can basically originate from any given USB devices, such as e.g. mouse, keyboard, mass storage media or the like, or for example also already have been gathered together via a USB hub. In accordance with the USB specifications the USB data can be based on different transmission speeds (low speed, full speed, high speed), for which in their turn different maximum sizes of the USB packets are defined in the standard. The maximum size of a USB packet corresponds to a maximum number of bits, e.g. 8 bytes at low speed up to 1024 bytes at high speed, that the respective USB packet contains.

The fact that the USB data or the individual USB packets are divided up means that in particular a larger USB packet is divided up into a number of transfer packets. The USB data is thus useful transfer data of the transfer packet. A start is preferably already made with the division of the USB data into transfer packets as soon as a part of a USB packet has been received that corresponds to the second number of bits. In particular the second number of bits is smaller than the first number of bits. Even if the term “bits” is used in this context it is clear that the size of the unit for data transmission is typically specified in bytes.

The transfer packets (also referred to as droplets) are inserted into the data stream, i.e. in particular into the continuous streaming data. It thus represents foreign data, which can basically be arranged at any given position between the streaming data. In order to be able to distinguish the transfer packets from the rest of the streaming data in the data stream, an interruption pattern is added to at least one initial transfer packet.

The interruption pattern involves a bit sequence that is as characteristic as possible. It can for example be statically defined or e.g. be selected from a number of predefined interruption patterns, as will be explained in greater detail later.

Even if the interruption pattern could basically follow the transfer packet, it is advantageous for the further data processing if the interruption pattern precedes the transfer packet. The interruption pattern thus identifies the associated transfer packet and signals to a receiver that a transfer packet is involved. The combination of interruption pattern and transfer packet is also referred to as a drop.

Since the USB data involves time-critical data it is advantageous for the USB data in the transfer packets to be sent onwards as soon as possible. The USB data is transmitted via the transfer packets transparently and in particular bit-transparently, i.e. so that the USB data will be reconstructed identically again on receipt after its transfer, without a source of the USB data Information having to be present. Therefore the USB data can already be divided between transfer packets, even before a USB packet has been received in its entirety. As a result it is possible for the transfer packet to be transferred in a time segment that is as short as possible after it was created, i.e. in a directly following clock or timing pulse of the data stream. These time savings are especially advantageous since any time saving in the data processing brings about a possible lengthening of the transmission path for the USB data.

The means for transmission of the data stream in this case is designed so that, as well having the bandwidth needed for the streaming data, it can additionally also transmit the USB data in the form of the transfer packets.

The send unit mentioned at the outset for sending of USB data in a data stream that comprises streaming data has the following components. It comprises at least one streaming input interface for receiving the streaming data as well as a USB input interface for receiving the USB data, which comprises a number of USB packets with a first number of bits. Moreover it comprises a distribution unit for dividing up the USB data in order to create a number of transfer packets with a second number of bits of USB data. The send unit further comprises a combination unit for insertion of a transfer packet into the data stream. Furthermore it has an output interface for sending the assembled data stream. In this case an interruption pattern is added to at least one initial transfer packet in order to signal that USB data is present in the data stream.

The send unit thus has all components for carrying out an inventive method for sending of data.

With the method for receiving data stated at the outset, in a first step an assembled data stream is received, which can be transferred according to an inventive method. In a further step an interruption pattern is identified in the data stream. Using the interruption pattern the data stream is divided up into transfer packets and streaming data. In a further step the USB data contained in the transfer packets is reconstructed into USB data packets, which in particular are identical to the original USB data packets. In a further step the streaming data and the reconstructed USB data are output separately.

The receive unit stated at the outset serves to receive USB data in a data stream, which comprises streaming data. It has an input interface for receiving an assembled data stream, which comprises transfer packets and streaming data. In this case an interruption pattern is added to at least one initial transfer packet in order to signal that USB data is present in the data stream. The input interface thus serves to receive an inventively transferred data stream. The receive unit moreover has an identification unit for identification of an interruption pattern. It further comprises a distribution unit for dividing up the data stream into transfer packet and streaming data using the interruption pattern. Via a reconstruction unit also included, the USB data contained in the transfer packets is reconstructed to USB data packets. Moreover the receive unit comprises at least one streaming output interface for output of the streaming data as well as a USB output interface for output of the USB data.

The receive unit thus has all components for carrying out an inventive method for receiving data.

The method for transfer of data stated at the outset comprises the steps for sending data via an inventive method for transfer of USB data as well as the steps of an inventive method for receiving data.

The transmission system stated at the outset for transmission of USB data in at least one data stream, which comprises streaming data, has the following components. It comprises a client apparatus with an inventive send unit and an inventive receive unit. Moreover it comprises a host apparatus with an inventive send unit and an inventive receive unit. In this case the send unit of the client apparatus is connected to the receive unit of the host apparatus and the send unit of the host apparatus to the receive unit of the client apparatus.

The client apparatus is thus in a typical client-host relationship with the host apparatus, in which the host provides services, e.g. computing power, for the client, which can be requested by the client. Each transmission path, i.e. on the one hand from the client apparatus to the host apparatus and on the other hand from the host apparatus to the client apparatus, is preferably unidirectional and not connected to the other transmission path. Via the two transmission paths the transmission system makes possible a bidirectional transmission of USB data and streaming data. Each transmission path is embodied in this case so that it comprises the components that are necessary for carrying out an inventive method for transmission of data.

A large part of the aforementioned components of the send unit, of the receive unit and/or of the transmission system can be realized entirely or in part in the form of logic circuits or logic arrangements.

These components can however also basically be realized, in particular when it is matter of especially fast computations, in the form of software-supported hardware, for example FPGAs, ASICs or the like. Likewise the interfaces needed, for example when it is only a matter of accepting data from other software components, can be embodied as software interfaces. They can however also be embodied as interfaces constructed from hardware, which are controlled by suitable software.

A largely software-based realization has the advantage that send units, receive units and/or transmission systems already used previously can be upgraded in a simple way by a software update or a reconfiguration of the FPGA in order to work in the inventive way. In this regard the object is also achieved by a corresponding computer program product, which is able to be wired into a programmable logic arrangement of a send unit, a receive unit and/or a transmission system, with program sections or logical instructions for carrying out steps of the inventive method when the logic is executed in the send unit, the receive unit and/or the transmission system. Such a computer program product, as well as the computer program, can where necessary comprise additional elements such as e.g. documentation and/or additional components, including hardware components, such as e.g. hardware keys (dongles etc.) for use of the software.

For transport to the send unit, to the receive unit and/or to the transmission system and/or for storage at or in the send unit, the receive unit and/or the transmission system a computer-readable medium, for example a memory stick, a hard disk or another transportable or permanently installed data medium can be used, on which the programmable and executable program sections of the computer program able to be executed on the logic arrangement of the send unit, the receive unit and/or the transmission system are stored. For this purpose the logic arrangement can for example have one or more interoperating logic elements or the like.

Further especially advantageous embodiments and developments of the present invention emerge from the dependent claims as well as from the description given below, wherein the claims of one claim category can also be developed similarly to the claims and parts of the description for another claim category and in particular individual features of different exemplary embodiments or variants can also be combined to form new exemplary embodiments or variants.

A transfer packet is preferably inserted into the data stream and transferred in a short section of time after it has been created. A transfer packet being inserted into the data stream in a short section of time after it has been created preferably means that it is inserted a few timing pulses or clocks after its creation and where necessary after a preceding interruption pattern. Especially preferably it is inserted at most four clocks after its creation, even further preferably at most two clocks after its creation and most preferably at most one clock after it creation. The clock can for example amount to 60 MHz, as is typically output by an ULPI-PHY chip, or the clock is oriented to requirements of components that are typically used in the USB3 standard. Preferably however the clock is used that the serializer-deserializer or the output interface also uses for output or for receipt of the data stream, i.e. for example 156 MHz.

A transfer packet preferably also comprises transfer control data, which contains information about where, that is at which following position or in which time interval a further transfer packet is transmitted. Thus in particular the initial transfer packet, which is characterized by the interruption pattern, can specify via the transfer control data, where or when further transfer packets follow. Naturally each further transfer packet can thus contain further transfer control data. Especially preferably however an interval is predefined that specifies the gap between the following transfer packets. This interval is preferably defined in relation to the clock of the data stream. Accordingly it only has to be specified via the transfer control data that a further transfer packet is transmitted in the predefined interval. This enables the data volume or the number of bits needed for the corresponding transfer control data advantageously to be kept small.

By using the previously described utilization of the transfer control data, after the initial transfer packet, the further transfer packets can be identified and be distinguished from the remaining streaming data with the aid of their position, time or their interval. The interruption pattern is thus no longer necessary for distinction. In order to save on data volume the further transfer packets preferably no longer have any interruption pattern.

Preferably each transfer packet has transfer control data. Through such data it is preferably specified with each transfer packet whether the next transfer packet is identified with the aid of its position, time and/or its interval or on the basis of an interruption pattern.

As already mentioned, the steps of division, insertion and transfer already begin as soon as a second number of bits of USB data have been received. This thus advantageously enables the USB data to already be processed and transferred when an entire USB packet has not yet been received. The division and insertion preferably takes place with each four bytes received, especially preferably with each byte received and quite especially preferably with each two bytes received. This division into small parts advantageously enables the remaining streaming data also to be transferred in the data stream without any greater delay.

The interruption pattern is preferably selected so that it occurs as rarely as possible in the remaining streaming data. For this purpose for example a bit pattern from practical experience can be selected. This means that bit patterns are analyzed or counted over a longer period of time and the pattern selected as the interruption pattern is the one that occurs most rarely. Especially preferably in this way a number of predefined interruption patterns that rarely occur can thus be determined, and in operation that pattern that has occurred most rarely in the currently defined time interval is selected from this number. The selection of an interruption pattern in this way ensures that the interruption pattern collides as little as possible with the remaining streaming data.

Preferably the interruption pattern comprises two identical subpatterns, which especially preferably, as described previously, are selected. If the case now occurs that this two-part interruption pattern arises in the streaming data, preferably a third identical subpattern is appended to the streaming data. On receipt of the data it can now be sorted so that only data is assigned to the USB data that has precisely two identical part interruption patterns. If only one part interruption pattern occurs, it is assigned to the remaining streaming data. If however three part interruption patterns occur in sequence, one part interruption pattern is again removed and the two part interruption patterns are assigned to the streaming data.

The transfer control data also preferably comprises information as to which interruption pattern is being used at that moment. Accordingly a transfer packet can define for the next transfer packet that another interruption pattern is being used. The transfer control data can further preferably also contain information about whether the transfer packet contains the beginning, the middle or the end of a USB packet. Furthermore the transfer control data can contain information about whether a further transfer packet is to be appended directly following the transfer packet. Furthermore the transfer control data can contain information about how large the transfer packet is, i.e. how many bytes of data it comprises, e.g. one byte of data, two bytes of data or four bytes of useful transfer data. As an alternative it can also be defined that the transfer packet merely comprises USB control data.

Preferably a transfer packet comprises transfer check data, with which transmission errors can be established and optionally corrected. This can be done for example via CRC (Cyclic Redundancy Check) data, by which a checksum random transmission errors can be detected in the known way and if necessary also corrected.

BRIEF DESCRIPTION OF THE DRAWINGS

The present invention will be explained once again in greater detail with reference to the enclosed figures with the aid of exemplary embodiments. In this case the same components are provided with identical reference numbers in the different figures.

As a rule the figures are not true-to-scale. In the figures:

FIG. 2 shows a schematic block diagram of an exemplary embodiment of a combined inventive send and receive unit, FIG. 3 shows a schematic exemplary embodiment of a data structure of a transfer packet, FIG. 4 shows a schematic exemplary embodiment of a data structure of a transfer packet that comprises USB control data, FIG. 5 shows a schematic block diagram of an exemplary embodiment of an interface between a combined inventive send and receive unit and a ULPI-PHY chip, FIG. 7 shows a schematic block diagram of an exemplary embodiment of an inventive receive unit and FIG. 8 shows a flow diagram of an exemplary embodiment of an inventive transmission method.

DETAILED DESCRIPTION

Figure 1:
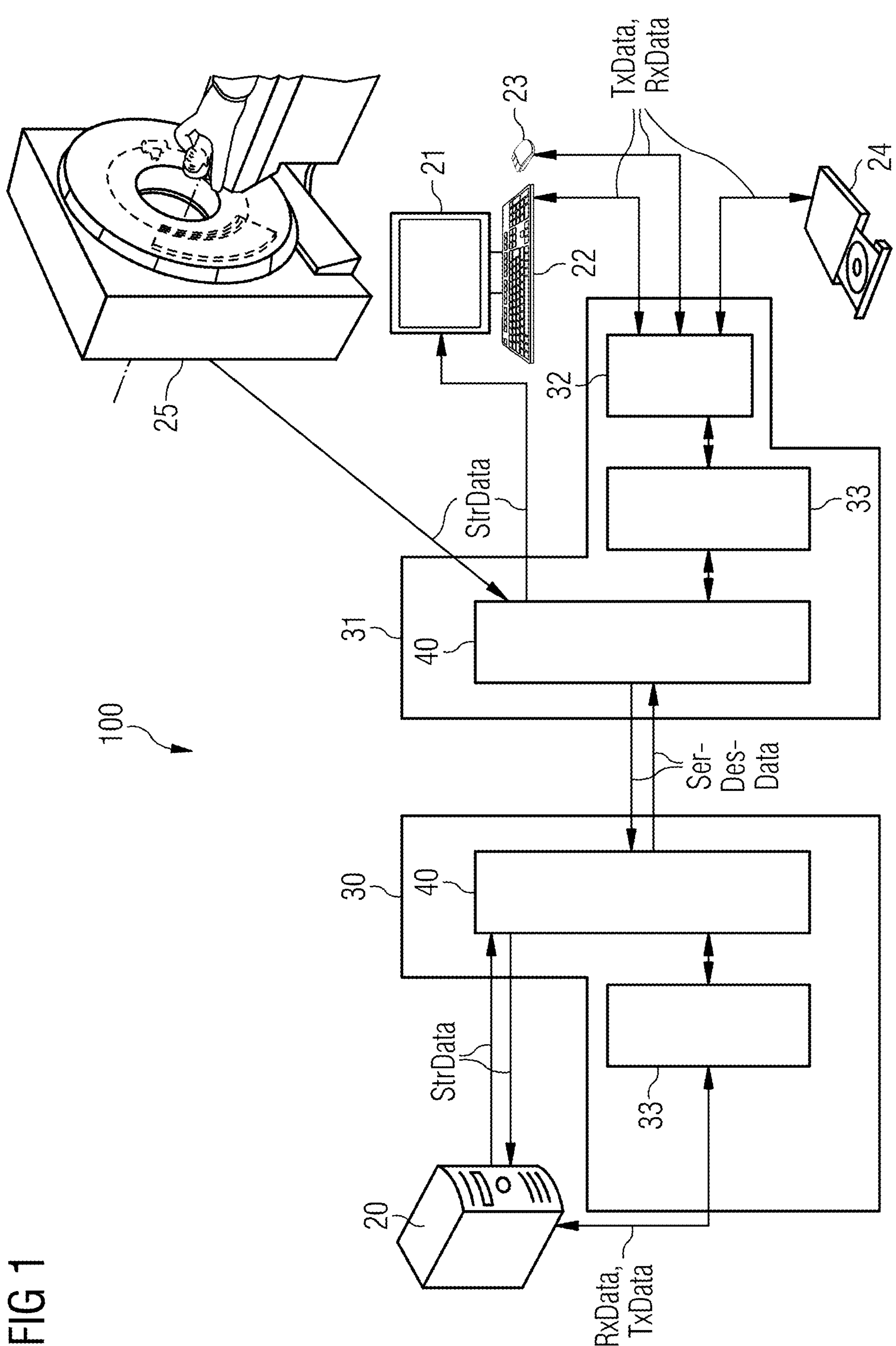
FIG. 1 shows a schematic block diagram of an exemplary embodiment of an inventive transmission system.

Shown by way of example and schematically as a block diagram in FIG. 1 is an inventive transmission system 100. The transmission system 100 comprises a host apparatus 30 and a client apparatus 31, which are essentially designed similarly. They are connected bidirectionally via a line, which makes possible the transmission of multiplexed data SerDesData. The connection can be made for example as an optical or electrical connection. The host apparatus 30 and the client apparatus 31 are embodied similarly and both comprise a commercially available USB 2.0 Transceiver Macrocell Interface (UTMI) Low Pin Interface (ULPI)-PHY chip 33 (e.g., a ULPI transceiver) as well as an exemplary embodiment of a combined inventive send and receive unit 40, which will be explained in greater detail with the aid of FIG. 2.

The send and receive unit 40 of the host apparatus 30 is connected via the ULPI-PHY chip 33 to a processing unit 20 as host, in particular as USB host, for exchange of USB data RxData, TxData. The processing unit 20 further has, depending on need and design, one or more connections to the transmit and receive unit 40 of the host apparatus 30, which are configured for transmission, i.e. for transfer or for receiving of streaming data StrData, e.g. a high speed serial link (HSSL) connection. The streaming data StrData comprises for example audio data, video data, measurement data from medical devices and/or the like, as well as where necessary associated streaming control data StrCtrl (see FIG. 2 and FIG. 6), but no USB data.

The send and receive unit 40 of the client apparatus 31 is connected differently from the host apparatus 30 via the ULPI-PHY chip 33 as a USB interface initially to a USB hub 32 for exchange of USB data RxData, TxData. Connected to the USB hub 32 are diverse USB terminals 22, 23, 24, e.g. a keyboard 22, a mouse 23, a DVD drive 24, mass storage media (not shown here) and/or the like. The send and receive unit 40 of the client apparatus 31 is moreover connected for receipt of streaming data StrData in the form of measurement data to a CT device 25 as a medical device as well as for transfer of streaming data StrData in the form of video data to a screen 21 as an optical output device, mechanism, or alternatively, means.

Both the USB data RxData, TxData and also the streaming data StrData is transmitted via the connection between the host apparatus 30 and the client apparatus 31, in each direction in the data stream SerDesData, as is described in more detail below.

FIG. 2 shows by way of example and schematically a block diagram of a combined inventive send and receive unit 40, which comprises a send unit 50 and a receive unit 70. The send unit 50 transfers an inventively assembled data stream SerDesData via an output interface 62, while the receive unit 70 receives an inventively assembled data stream SerDesData via an input interface 71.

The send and receive unit 40 moreover has a USB interface 41, which is connected bidirectionally to the ULPI-PHY chip 33 and thus exchanges ULPI data ULPIData according to the ULPI standard. Moreover the ULPI-PHY chip 33 sends its ULPI clock signal ULPI-Clk to the USB interface 41. The USB interface 41 is connected for exchange of outgoing USB data TxData to the send unit 50 and for exchange of incoming USB data RxData to the receive unit 70. Moreover it receives the outgoing clock SerDesTxClk from the output interface 62 and the incoming clock SerDesRxClk from the input interface 71 and synchronizes the two clocks or timing pulses SerDesTxClk, SerDesRxClk with one another and also with the ULPI clock signal ULPI-Clk. The USB interface 41 will be described in more detail with the aid of FIG. 5.

The send unit 50 is connected to a streaming input interface 52, from which it receives streaming data StrData, which here also comprises streaming control data StrCtrl. The send unit 50 combines the outgoing USB data TxData with the streaming data StrData and transfers it as an assembled data stream SerDesData, in which the USB data TxData is transmitted bit-transparently. The send unit 50 and the processes running in it are described in more detail in FIG. 6.

The receive unit 70 divides the assembled data stream SerDesData into incoming USB data RxData and streaming data StrData, which also comprises streaming control data StrCtrl. It transmits the incoming USB data RxData to the USB interface 41 and the streaming data StrData to the streaming output interface 76. The receive unit 70 and the processes running in it are described in more detail in FIG. 7.

Figure 5:
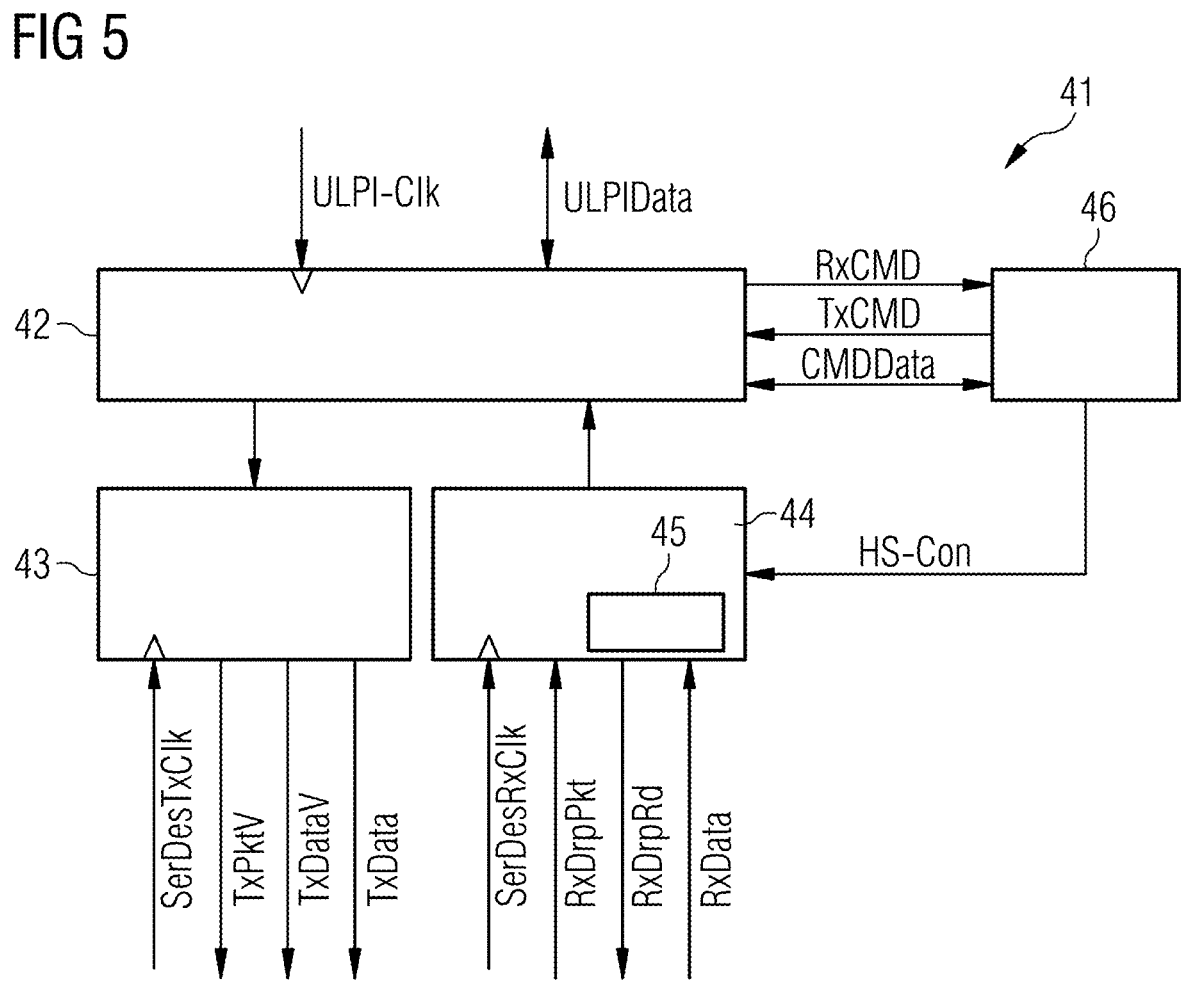

FIG. 5 shows by way of example and schematically a block diagram of a USB interface 41 of an inventive send and receive unit 40. The USB interface 41 comprises a ULPI interface 42, which is connected to the ULPI-PHY chip 33, a USB output interface 43, which is connected to the ULPI interface 42 and the send unit 50, and a USB input interface 45, which is connected to the ULPI interface 42 and the receive unit 70.

As already described, the connection and transmission of ULPI data ULPIData and ULPI clock signal ULPI-Clk between the ULPI interface 42 and the ULPI-PHY chip 33 takes place according to the ULPI standard.

The USB output interface 43 synchronizes the USB interface 41 with the signal of the outgoing clock SerDesTxClk. It receives from the ULPI interface 42 the outgoing USB data TxData and transmits it to the send unit 50. Moreover the USB output interface 43 transmits an outgoing packet validation signal TxPktV as a slope, while a USB packet is transmitted, and a data validation signal TxDataV, while a byte of USB data is read out from the ULPI interface 42.

The USB input interface 44 synchronizes the USB interface 41 with the signal of the incoming clock SerDesRxClk. It is moreover connected to the receive unit 70 and receives incoming USB data RxData from there as well as an associated incoming packet validation signal RxDrpPkt as a slope, while a USB packet is being transmitted. The USB input interface 44 sends a read request signal RxDrpRd in order to retrieve USB packets, provided they are available at the receive unit 70.

A USB control unit 46 of the USB interface 41 receives via the ULPI interface 42 incoming USB control data RxCMD, such as e.g. a change of the USB status, from the ULPI-PHY chip 33 in the established ULPI format and converts it to USB control data CMDData in a form suitable for the transfer packets SP.

Via outgoing USB control data TxCMD, which is translated from the USB control data CMDData of the incoming transfer packets SP, the USB control unit 46 transfers the USB interface 41 via the ULPI interface 42 to the ULPI-PHY chip 33 in the established ULPI format command, such as e.g. the request for additional information or a change in the configuration of the ULPI-PHY chip 33, such as for example a change in the transmission speed from full speed (FS) to high speed (HS).

According to the configuration of the ULPI-PHY chip 33 the USB control unit 46 also indicates to the USB input interface 44 the transmission speed via the speed signal HS-Con, so that the USB data can be output accordingly via the ULPI interface 42.

In this form of embodiment the USB input interface 44 comprises a buffer 45 in which the transfer packets can be assembled to USB packets and output as a function of the transmission speed. This part of the USB interface 41 is thus to be functionally assigned to the receive unit 70. As an alternative the USB packets can also be directly reconstructed or assembled in the receive unit 70, such as will be further described with the aid of FIG. 7.

Figure 6:
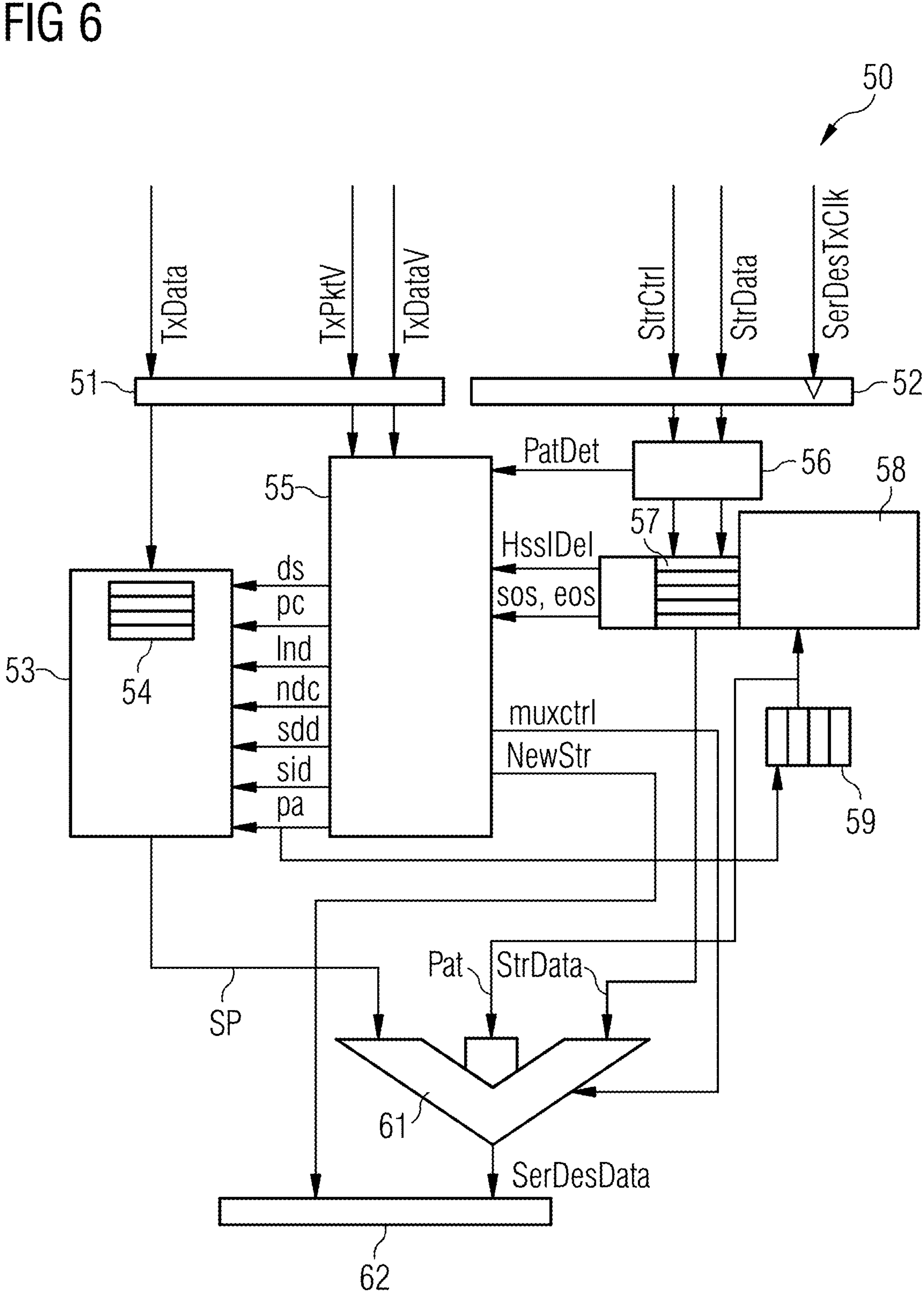
FIG. 6 shows a schematic block diagram of an exemplary embodiment of an inventive send unit.

Shown by way of example and schematically in FIG. 6 is a block diagram of an inventive send unit 50. The send unit 50 comprises a USB input interface 51 for receiving the outgoing USB data TxData. The outgoing USB data TxData, as described with the aid of FIG. 5, transmitted from the USB interface 41, is received, forwarded to the distribution unit 53 and stored there in a buffer 54 until it is divided into a number of transfer packets SP. The outgoing USB data TxData is initially available in the form of USB packets, which comprise a first number of bits. They are divided in the distribution unit 53 into transfer packets SP or droplets with a second number of bits, e.g. two bytes, of USB data TxData.

The transfer packets SP furthermore comprise transfer control data ds, pc, lnd, ndc, sdd, sid, pa, which is received by a transmit control unit 55 and arranged following after the USB data TxData. For checking the correct transfer of a transfer packet SP a checksum or Cyclic Redundancy Check CRC is arranged preceding said packet. The bits in a transfer packet are arranged according to a predefined scheme. How the scheme is embodied in detail can be determined depending on the specific requirements. The transfer packets SP assembled in this way are transferred to a combination unit 61, which puts together the outgoing data stream SerDesData.

FIG. 3 shows a schematic example of such a transfer packet SP. The first byte b0, b1, . . . , b7 is intended for the Cyclic Redundancy Check CRC, which is formed based on the other bits in the known way. The second and third bytes b8, b9, . . . , b15, b16, b17, . . . , b23 are regularly intended for the useful data, i.e. the USB data data0, data1 or USB control data mt0, mt1, rsi, res, ct0, ct1, ct2, ct3 (see FIG. 4). The fourth byte b24, b25, . . . , b31 contains the transfer control data pa0, pa1, pc0, pc1, lnd, ndc, ds0, ds1.

The transfer control data pa0, pa1, pc0, pc1, lnd, ndc, ds0, ds1 is explained individually below. The bits pa0, pa1 signal which interruption pattern Pat is active. I.e. one of four predefined interruption patterns Pat is selected by this, which identifies the next transfer packet SP. The bits pc0, pc1 contain USB packet control data. I.e. they specify USB packet states, namely "start of packet" (SOP), i.e. the beginning of a USB packet, "end of packet" (EOP), i.e. the end of a USB packet, "body of packet", i.e. the body or central part of a USB packet, or via "command" that USB control data mt0, mt1, rsi, res, ct0, ct1, ct2, ct3 is being transferred in the transfer packet SP. It is signaled via the bit lnd whether a further transfer packet follows directly, i.e. without interruption pattern Pat, after the transfer packet SP or droplet. Otherwise it signals that streaming data StrData follows. The bit ndc signals whether a further transfer packet SP follows at a predefined interval and preferably without additional interruption pattern Pat. Otherwise it signals that the next transfer packet SP is identified by an interruption pattern Pat. The bits ds0, ds1 give the size of the current transfer packet, i.e. whether it contains no, one or two data bytes Data0, Data1. That no data byte is contained can also mean in this case that only USB control data mt0, mt1, rsi, res, ct0, ct1, ct2, ct3 is contained in the transfer packet SP.

Shown in FIG. 4 is a schematic example for the transmission of USB control data mt0, mt1, rsi, res, ct0, ct1, ct2, ct3 in data byte data1 of a transfer packet SP. The transmission of USB control data mt0, mt1, rsi, res, ct0, ct1, ct2, ct3 is signaled via the transfer control data pc0, pc1 as well as ds0, ds1. The USB control data mt0, mt1, rsi, res, ct0, ct1, ct2, ct3 is explained individually below. The bits mt0, mt1 specify the message type. This signals whether pure information is involved that does not require any response, whether a response is requested, or whether it involves a requested response. The bit rsi signals whether a message sent for a first time or a repeatedly sent message is involved. The bit res remains free for further implementations and is set to 0. Via the bits ct0, ct1, ct2, ct3 different control processes defined in ULPI are signaled, namely e.g. "Idle", "Client Connect", "Controller reset", "Client chirp started", "Controller start of frame timeout", "Controller suspend", "Controller SEO", "Controller resume start". The further bits the byte data0 of transfer packet SP basically also available for USB control data are reserved for further implementations.

The transmit control unit 55 preferably instructs the distribution unit 53 to distribute 2 bytes of USB data TxData to the transfer packets SP in each case. Should however the time between two outgoing packet validation signals TxPktV be too long, a transfer packet SP with only one byte of USB data TxData can also be generated.

The send unit 50 in FIG. 6 further has a streaming input interface 52 for receiving the streaming data StrData. It is embodied for example as an HSSL interface or the like. As well as the actual streaming data StrData, streaming control data StrCtrl is also received via the streaming input interface 52, which for example signals a start of stream sos or an end of stream eos. Moreover the outgoing clock SerDesTxClk, which is provided by the output interface 62, is received via the streaming input interface 52. As an alternative this can for example also be created via a clock generator, in the send unit 50. All processes running in the send unit 50, such as e.g. also the distribution of the USB data TxData to transfer packets SP in the distribution unit 52, are preferably carried out with the outgoing clock SerDesTxClk or are thus clocked.

The streaming data StrData is transferred to a pattern recognition unit 56. The pattern recognition unit 56 signals the occurrence of an interruption pattern Pat or of a subpattern to the transmit control unit 55 via a pattern-detected signal.

The streaming data StrData is subsequently buffered in a buffer 57. This preferably comprises four or more double words of streaming data StrData in order to be able to determine an interruption of the streams early enough to be able to ensure the further transfer of the time-critical outgoing USB data TxData. Connected to the buffer 57 is a pattern analyzer 58. The pattern analyzer 58 counts the occurrence of a number of, preferably four different, predefined interruption patterns Pat or their subpatterns in each case in the streaming data StrData. The interruption patterns Pat or their two identical subpatterns are stored in a pattern memory 59 and can be retrieved from there and updated therein, e.g. with an update or by a pattern selection process.

Bandwidth is advantageously saved through the selection of the interruption patterns Pat occurring most rarely, since fewer additional subpatterns have to be inserted to identify the streaming data StrData. The pattern analyzer 58 indicates to the transmit control unit 55 the corresponding interruption pattern Pat and the transmit control unit 55 transfers the corresponding information in the control data pa0, pa1 of the next transfer packet SP.

The pattern analyzer 58 is integrated here into the send unit 50. As an alternative however it can also be embodied as a separate unit, which is connected via corresponding interfaces to the send unit 50.

A central task of the transmit control unit 55 is to control the combination of the outgoing assembled data stream SerDesData, which is transferred via an output interface 62. To do this it sends a combination control signal muxctrl to a combination unit 61. Preferably it ensures that USB data TxData is inserted with a clock of the outgoing clock SerDesTxClk as a transfer packet into the outgoing combined data stream SerDes or where necessary at least the preceding interruption pattern SP is inserted within a clock of the outgoing clock SerDesTxClk into the outgoing combined data stream SerDes. For this purpose, depending on the USB data TxData arriving in the buffer 54, it generates transfer control data pa0, pa1, pc0, pc1, lnd, ndc, ds0, ds1 for the transfer packets SP to be inserted. In particular in this case it is established via the control data lnd, ndc when the next transfer packet SP follows, i.e. whether it follows directly, at a predefined interval or whether it is signaled, e.g. as an initial transfer packet SP, by an interruption pattern Pat. When a transfer packet SP is signaled by an interruption pattern Pat, the transmit control unit 55 instructs the combination unit 61 first to insert the currently used interruption pattern Pat from the pattern memory 59 and then the transfer packet SP.

If the current interruption pattern Pat with two identical subpatterns occurs in the streaming data StrData, the transmit control unit 55 instructs the combination unit 61 to insert a further identical subpattern into said data. This enables a logic in the receive unit 70 (see FIG. 7) to interpret that data as streaming data StrData when three consecutive or only one subpattern occurs. Only when the interruption pattern Pat occurs with precisely two identical consecutive subpatterns is the following data interpreted as a transfer packet.

Provided there is no requirement for sending transfer packets SP via the combined data stream SerDesData, the streaming data StrData is sent—where necessary with the described inserted additional subpatterns. If no stream is opened, i.e. no streaming data StrData is being sent, but transfer packets SP have to be sent, the transmit control unit 55 can instruct the output interface 62 directly via a stream-open signal NewStr to open a new data stream SerDesData. This can then be kept open where necessary and as long as is required, via so-called idle packets, i.e. transfer packets SP, which do not contain any further relevant data.

Figure 7:
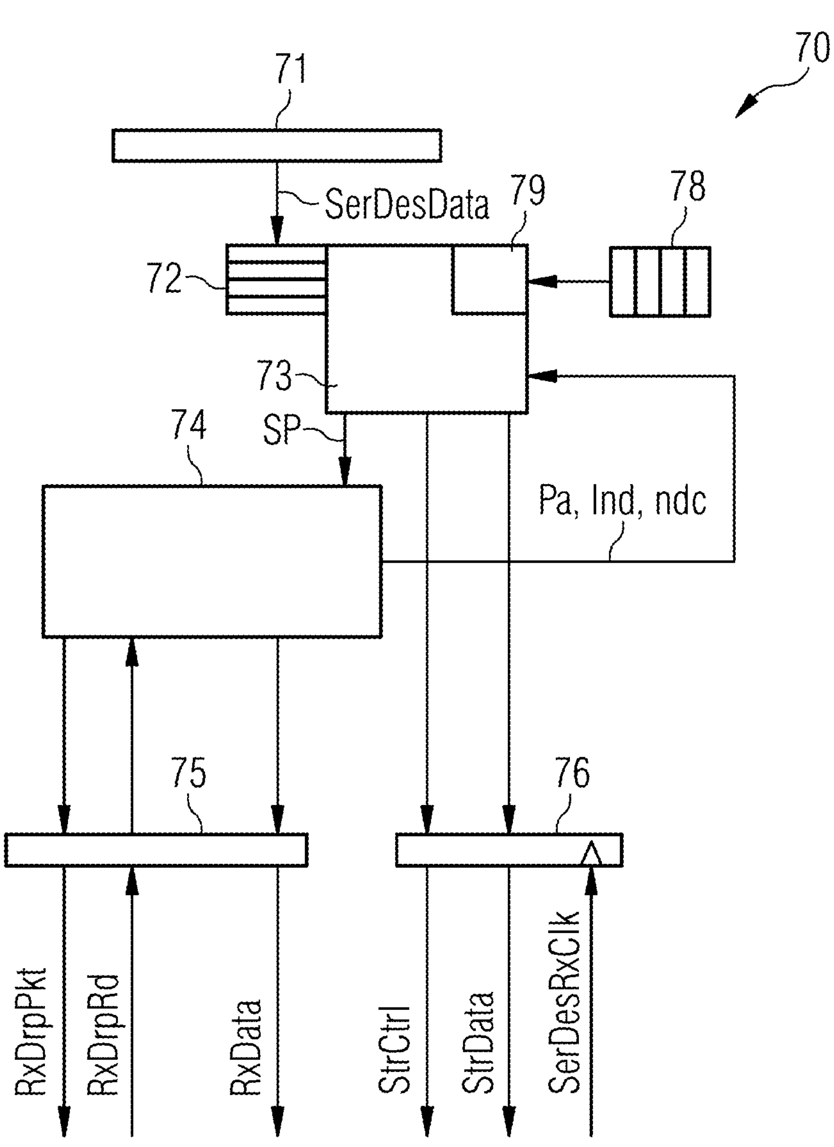

Shown by way of example and schematically in FIG. 7 is a block diagram of an inventive receive unit 70. It is used for receiving incoming USB data RxData in the form of transfer packets SP in a data stream SerDesData, which has been transferred as described above and comprises streaming data StrData. To this end the receive unit 70 has an input interface 71, which is connected to the output interface 61 of the send unit 50 from FIG. 6.

The input interface 71 transmits the data into a buffer 72 of a division unit 73, which divides the data stream SerDesData into transfer packets SP and streaming data StrData. The division unit 73 for its part comprises an identification unit 79, which identifies interruption patterns Pat or their identical subpatterns actively occurring in the assembled data stream SerDesData, in that they are compared with predefined patterns from a pattern memory 78. If an active interruption pattern Pat with precisely two consecutive identical subpatterns is identified, wherein the data directly following is not like the subpatterns, the data is identified as a transfer packet SP and forwarded to a reconstruction unit 74. An interruption pattern Pat identified in such a way cancels the previous planning via the transfer control data ndc for transfer packets SP following in an interval. If however a preceding transfer packet SP specifies that further transfer packets SP are planned via the transfer control data ndc, ldc as direct or following in an interval, the incoming data is interpreted accordingly as transfer packets SP and likewise forwarded to the one reconstruction unit 74.

If the aforementioned conditions are not present, i.e. precisely two identical subpatterns do not form an interruption pattern and the data is not interpreted as a transfer packet SP following directly or in an interval, the data is interpreted as streaming data StrData. With three consecutive identical subpatterns the subpattern additionally added during transfer is removed in order to restore the original streaming data StrData. The streaming data StrData is then forwarded to a streaming output interface 76 for output, which is synchronized with the incoming clock SerDesRxClk. Here too the streaming data StrData, as already described, comprises associated streaming control data StrCtrl.

The reconstruction unit 74 checks the transfer packet SP initially for its checksum according to the Cyclic Redundancy Check CRC. Transfer packets SP with incorrect checksums CRC are discarded. If through this USB data RxData does not arrive or does not arrive completely, this is picked up by the measures defined in the USB standard, such as e.g. a renewed request for the USB data involved.

Furthermore the transfer control data pa0, pa1, pc0, pc1, lnd, ndc, ds0, ds1 is evaluated. The information contained in the transfer control data pa0, pa1, lnd, ndc is transferred to the division unit 73 for the interpretation of the subsequent incoming data of the data stream SerDesData. The transfer control data pc0, pc1, ds0, ds1 relates, as described above, to the data data0, data1 contained in the current transfer packet SP and the current transfer packet is accordingly reconstructed to incoming USB data RxData in the form of USB packets. In the general case the transmission and reconstruction occurs without errors, so that the incoming USB data RxData is identical to the previously transmitted outgoing USB data TxData. The transmission thus takes place bit-transparently. The incoming USB data RxData reconstructed in this way is transmitted with the associated control data RxDrpRd, RxDrpPkt, as already described with the aid of FIG. 5, via a USB output interface 75 to a connected USB interface 41 or the ULPI-PHY chip 33, wherein it is synchronized with the ULPI clock signal ULPI-Clk of the ULPI-PHY chip 33 (not shown here).

As an alternative the reconstruction of the incoming USB data RxData can be done in a similar way to that described above in the USB interface 41. The corresponding components of the USB interface 41 are then to be assigned functionally to the receive unit 70.

Figure 8:
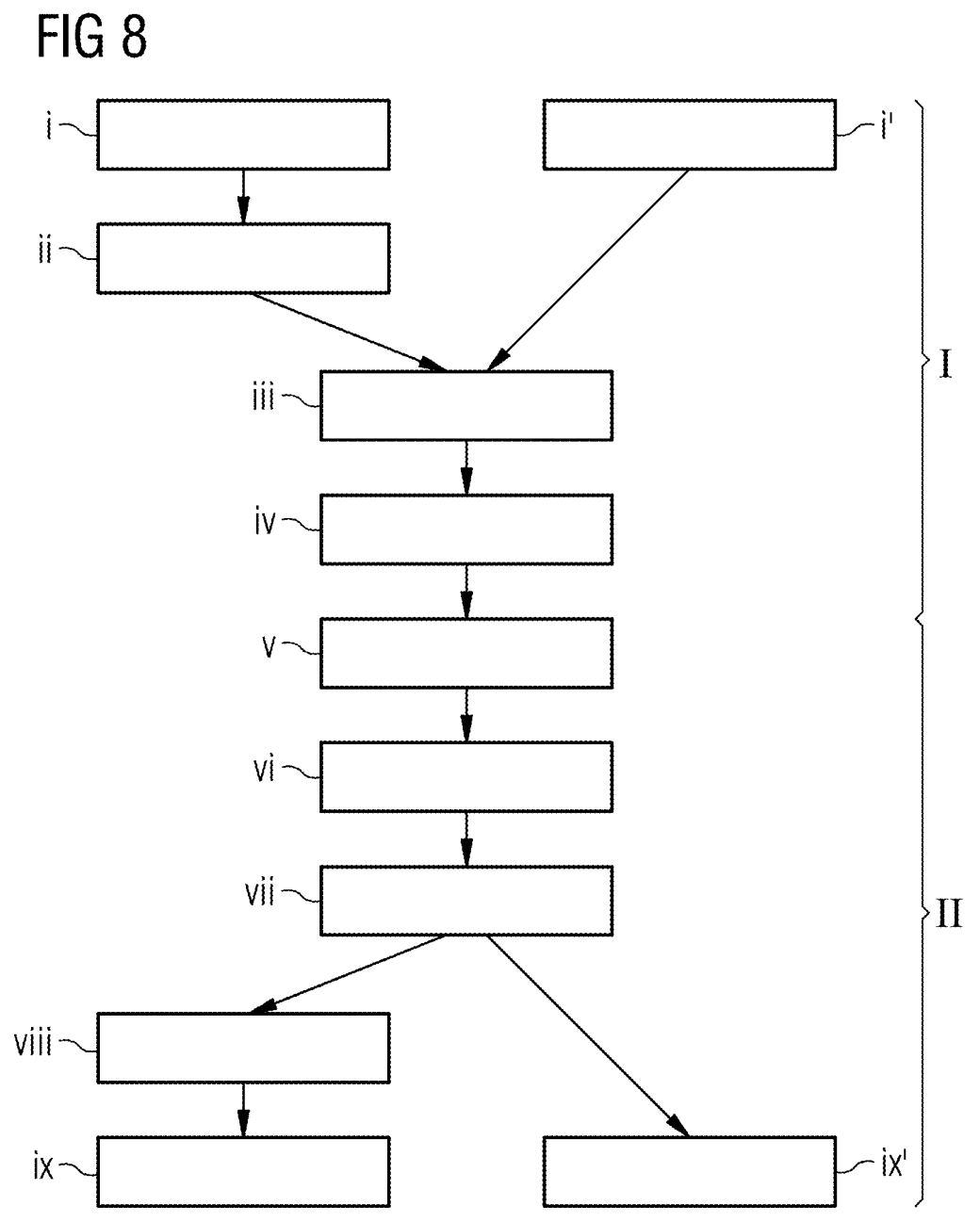

FIG. 8 shows by way of example and schematically a flow diagram of an inventive method for transmission of data, which comprises a method for transfer of data I and a method for receipt of data II. The method for transfer of data I is subdivided here into the steps i, i', ii, iii, iv and is in particular carried out in a send unit 50, as has been described with the aid of FIG. 6.

In a step i, as described above with the aid of the send unit 50, outgoing USB data TxData, which comprises a number of USB packets with a first number of bits, is received via a USB input interface 51. Moreover, in a step i' streaming data StrData is received via a streaming input interface 52.

In a further step ii the outgoing USB data TxData is divided up via distribution unit 53 and thereby a number of transfer packets SP with a second number of bits of USB data created.

The transfer packets SP are inserted in a step iii in a combination unit 61 into a data stream SerDesData, wherein at least an initial transfer packet SP is characterized by an interruption pattern Pat. The interruption pattern Pat is also in particular inserted into the data stream SerDesData in the form of two identical subpatterns and preferably directly before the transfer packet SP. The fact that the streaming data StrData is moreover transmitted in the data stream SerDesData means that thus a combined or assembled data stream SerDesData is produced.

The assembled data stream SerDesData is transferred in a step iv via an output interface 62.

The method for receiving data II is subdivided here into the steps v, vi, vii, viii, ix, ix' and is carried out in particular in a receive unit 70, as has been described with the aid of FIG. 7.

In a step v the assembled data stream SerDesData, transferred as described in step iv, is received via an input interface 71 of the receive unit 70. The assembled data stream SerDesData thus comprises transfer packets SP and streaming data StrData. In this case at least one initial transfer packet SP has an interruption pattern Pat. Thus it signals that the USB data RxData is present in the following data stream SerDesData.

In a further step vi at least one interruption pattern Pat is identified in the assembled data stream SerDesData via an identification unit 79.

The interruption pattern Pat identifies the directly following transfer packet SP, so that, in a following step vii, a division unit 73 divides up the data stream SerDesData using the interruption pattern Pat into transfer packets SP and streaming data StrData.

In a step viii the incoming USB data RxData contained in the transfer packets SP is reconstructed via a reconstruction unit 74 to USB data packets.

The incoming USB data RxData reconstructed to packets is output in a step ix via a USB output interface 75.

The separated streaming data StrData is output in a step ix' via a streaming output interface 76.

In conclusion it is pointed out once again that the apparatuses and methods described in detail above merely involve exemplary embodiments, which can be modified by the person skilled in the art in a wide variety of ways, without departing from the area of the present invention. Furthermore the use of the indefinite article "a" or "an" does not exclude the features concerned also being able to be present a number of times. Likewise the term "unit" does not exclude said unit consisting of a number of components, which if necessary can also be spatially distributed. Thus for example, as already described above, the reconstruction unit 74 of the receive unit 70 can also be embodied in the USB interface 41, which then serves at the same time as the USB output interface from the receive unit, wherein the transfer packets SP in this case are first reconstructed in the USB interface 41 to the outgoing USB packets. In another case it can be advantageous to process inwards and return path, thus an incoming and an outgoing data stream SerDesData, together in a combined send and receive unit 40, so that a few components can where necessary also be used jointly.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

What is claimed is:

1. A method for transfer of USB data in a data stream, the data stream including non-USB streaming data, the method comprising:

receiving the non-USB streaming data and at least a part of the USB data, the USB data including a number of USB packets with a first number of bits, and the non-USB streaming data being non-USB data including at least one of audio data, video data, or measurement data;

dividing the USB data to create a number of USB transfer packets with a second number of bits of USB data;

inserting a USB transfer packet, from among the number of USB transfer packets, into the data stream by combining the USB transfer packet with the non-USB streaming data; and transferring the data stream, wherein an interruption pattern is added to at least an initial USB transfer packet to signal that USB data is present in the data stream.

2. The method as claimed in claim 1, wherein the USB transfer packet comprises transfer control data, which includes information indicative of where a further USB transfer packet is to be transmitted.

3. The method as claimed in claim 2, wherein the information specifies that the further USB transfer packet is to be transmitted at a defined interval.

4. The method as claimed in claim 2, wherein the further USB transfer packet does not have an interruption pattern.

5. The method as claimed in claim 1, wherein each of the number of USB transfer packets comprises transfer control data.

6. The method as claimed in claim 1, wherein the dividing and the inserting begin upon receipt of the second number of bits of USB data.

7. The method as claimed in claim 1, further comprising: selecting the interruption pattern from a number of interruption patterns, such that the interruption pattern occurs as rarely as possible in remaining portions of the non-USB streaming data.

8. The method as claimed in claim 1, wherein the USB transfer packet comprises cyclic redundancy check data, the cyclic redundancy check data being usable to identify transmission errors.

9. The method as claimed in claim 8, wherein the cyclic redundancy check data is usable to identify and correct the transmission errors.

10. The method as claimed in claim 1, wherein the USB transfer packet is inserted into the data stream and transferred in a short period of time after creation.

11. The method as claimed in claim 1, wherein the interruption pattern includes two identical subpatterns, and the method further includes adding a third identical subpattern to distinguish the interruption pattern in response to the two identical subpatterns occurring in the non-USB streaming data.

12. A method for receiving data transferred according to the method of claim 1, the method comprising:

receiving the data stream;

identifying the interruption pattern;

dividing the data stream into the USB transfer packets and the non-USB streaming data based on the interruption pattern;

reconstructing the USB data included in the USB transfer packets into USB data packets; and separating output of the non-USB streaming data and the reconstructed USB data.

13. A non-transitory computer program product including a computer program, which is loadable into a logic arrangement of a receiver, the computer program having program sections for carrying out the method as claimed in claim 12, when the computer program is executed at the receiver.

14. A non-transitory computer program product including a computer program, which is loadable into a logic arrangement of a transmitter, the computer program having program sections for carrying out the method as claimed in claim 1, when the computer program is executed at the transmitter.

15. A non-transitory computer-readable medium storing program sections that, when executed on a logic arrangement at a transmitter, cause the transmitter to carry out the method of claim 1.

16. A non-transitory computer-readable medium storing program sections that, when executed on a logic arrangement at a receiver, cause the receiver to carry out the method of claim 12.

17. The method as claimed in claim 1, wherein the dividing the USB data includes adding the interruption pattern to at least the initial USB transfer packet of the divided USB data, the interruption pattern including at least two subpatterns.

18. The method as claimed in claim 1, wherein the interruption pattern identifies the associated transfer packet and signals to a receiver that a transfer packet is involved.

19. The method as claimed in claim 1, wherein the transferring the data stream includes transmitting the data stream including the USB transfer packet and the non-USB streaming data via one cable.

20. The method as claimed in claim 1, wherein the interruption pattern identifies the at least the initial transfer packet and signals to a receiver that the USB transfer packet is included.

21. The method as claimed in claim 1, wherein the transfer of USB data in the data stream is performed by a USB 2.0 Transceiver Macrocell Interface (UTMI) Low Pin Interface (ULPI) transceiver, and the non-USB streaming data is high speed serial link (HSSL) data.

22. A transmitter to transfer USB data in a data stream, the data stream including non-USB streaming data, the transmitter comprising:

at least one streaming input interface configured to receive the non-USB streaming data;

a USB input interface configured to receive the USB data, the USB data including a number of USB packets with a first number of bits, and the non-USB streaming data being non-USB data including at least one of audio data, video data, or measurement data;

a distribution unit configured to divide the USB data to create a number of USB transfer packets with a second number of bits of USB data, a combination unit configured to insert a USB transfer packet, from among the number of USB transfer packets, into the data stream by combining the USB transfer packet with the non-USB streaming data; and an output interface configured to transmit the data stream, wherein an interruption pattern is added to at least an initial USB transfer packet to signal that USB data is present in the data stream.

23. A transmission system to transmit USB data in at least one data stream, the data stream including non-USB streaming data, the transmission system comprising:

a client apparatus having a first transmitter and a first receiver; and a host apparatus having a second transmitter and a second receiver, wherein at least one of the first transmitter or the second transmitter are configured as a transmitter as claimed in claim 22, the first transmitter is connected to the second receiver, and the second transmitter is connected to the first receiver.

24. A receiver to receive USB data in a data stream, the data stream including non-USB streaming data, and the receiver comprising:

an input interface configured to receive an assembled data stream, which includes a combination of USB transfer packets and non-USB streaming data, wherein at least an initial USB transfer packet has an interruption pattern to signal that USB data is present in the data stream, and the non-USB streaming data is non-USB data including at least one of audio data, video data, or measurement data;

an identification unit configured to identify the interruption pattern;

a division unit configured to divide the data stream into USB transfer packets and non-USB streaming data based on the interruption pattern;

a reconstruction unit configured to reconstruct the USB data included in the USB transfer packets into USB data packets;

at least one streaming output interface configured to output the streaming data; and a USB output interface configured to output the USB data.

25. A transmission system to transmit USB data in at least one data stream, the at least one data stream including non-USB streaming data, the transmission system comprising:

a client apparatus having a first transmitter and a first receiver; and a host apparatus having a second transmitter and a second receiver, wherein at least one of the first receiver or the second receiver are configured as a receiver as claimed in claim 24, the first transmitter is connected to the second receiver, and the second transmitter is connected to the first receiver.

26. A method for transfer of USB data in a data stream, the data stream including non-USB streaming data, the method comprising:

receiving the non-USB streaming data and at least a part of the USB data, the USB data including a number of USB packets with a first number of bits, and the streaming data being non-USB data including at least one of audio data, video data, or measurement data;

inserting a USB packet, from among the number of USB packets, into the data stream by combining the USB packet with the streaming data; and transferring the data stream, wherein an interruption pattern is added to at least an initial USB packet to signal that USB data is present in the data stream.

27. A method for receiving data transferred according to the method of claim 23, the method comprising:

receiving the data stream;

identifying the interruption pattern;

dividing the data stream into at least one USB packet and the non-USB streaming data based on the interruption pattern; and separating output of the non-USB streaming data and the at least one USB packet.

28. The method as claimed in claim 26, wherein the interruption pattern identifies the associated USB packet and signals to a receiver that a USB packet is involved.

* * * * *